(12) United States Patent
Bertalon

(10) Patent No.: US 10,632,802 B1
(45) Date of Patent: Apr. 28, 2020

(54) TRAILER HITCH ADAPTOR

(71) Applicant: Raymond Gene Bertalon, Dansville, NY (US)

(72) Inventor: Raymond Gene Bertalon, Dansville, NY (US)

(73) Assignee: Wagon-Ho Products, Dansville, NY (US)

(*) Notice: Subject to any disclaimer, the term of this patent is extended or adjusted under 35 U.S.C. 154(b) by 0 days.

(21) Appl. No.: 16/698,882

(22) Filed: Nov. 27, 2019

(51) Int. Cl.
*B60D 1/07* (2006.01)
*B60D 1/36* (2006.01)

(52) U.S. Cl.
CPC ............. *B60D 1/075* (2013.01); *B60D 1/363* (2013.01)

(58) Field of Classification Search
CPC . B60D 1/075; B60D 1/07; B60D 1/36; B60D 1/363
See application file for complete search history.

(56) References Cited

U.S. PATENT DOCUMENTS

| | | | | |
|---|---|---|---|---|
| 3,572,759 A | * | 3/1971 | Baugh | A01B 59/006 172/272 |
| 4,664,403 A | | 5/1987 | Livingston | |
| 5,303,790 A | * | 4/1994 | Coleman | A01B 71/063 172/272 |
| 5,520,404 A | * | 5/1996 | Schulte | B60D 1/173 280/460.1 |
| 5,544,708 A | * | 8/1996 | Braun | A01B 59/006 172/272 |
| 5,582,255 A | * | 12/1996 | Nikkel | A01B 63/102 172/26 |
| 5,664,632 A | * | 9/1997 | Frasier | A01B 59/062 172/26 |
| 6,478,094 B2 | * | 11/2002 | Alexander | A01B 59/006 172/272 |
| 6,626,449 B2 | * | 9/2003 | Hazen | B60D 1/065 280/460.1 |
| 6,758,285 B2 | * | 7/2004 | Ollefs | B60D 1/141 172/439 |
| 7,059,419 B2 | * | 6/2006 | Greenwell | A01B 59/006 172/272 |
| 7,487,843 B2 | * | 2/2009 | Tuttle | A01B 59/062 172/272 |
| 7,690,669 B2 | * | 4/2010 | Johnson | B60D 1/07 172/248 |
| 10,195,913 B2 | * | 2/2019 | Thompson | B60D 1/025 |
| 2017/0246924 A1 | * | 8/2017 | Thompson | B60D 1/025 |

* cited by examiner

*Primary Examiner* — Jacob D Knutson
*Assistant Examiner* — Michael R Stabley
(74) *Attorney, Agent, or Firm* — Tracy Jong Law Firm; Tracy P. Jong; Cheng Ning Jong

(57) ABSTRACT

A trailer hitch adaptor for connecting a hitch to a trailer, the trailer hitch adaptor including an adaptor assembly having a front end connected to the hitch and a rear end connected to the trailer, the adaptor assembly including a stop assembly disposed on the front end of the adaptor assembly; a bar attached to a trailer; and a cradle assembly disposed on the rear end of the adaptor assembly, the cradle assembly including an opening facing upwardly, wherein the cradle assembly is configured for receiving the bar, wherein the trailer hitch adaptor is engaged with the trailer by bringing the stop assembly towards the bar until the bar had come in contact with the stop assembly before the bar is dropped into the opening of the cradle assembly to be disposed within the cradle assembly.

16 Claims, 5 Drawing Sheets

TRAILER HITCH ADAPTOR

BACKGROUND OF THE INVENTION

1. The Field of the Invention

The present invention relates to a trailer hitch adaptor. More specifically, the present invention is directed to a trailer hitch adaptor for facilitating the engagement and disengagement of a trailer hitch to a trailer.

2. Background Art

A single-point hitch presents tremendous challenges to a driver maneuvering a trailered vehicle especially in reverse. One way to solve this problem is by immobilizing the yaw relationship of the trailer with respect to the vehicle which tows it using a multi-point hitch. However, a multi-point hitch that facilitates maneuvering a trailered vehicle in reverse also presents the user an additional point of connection as compared to a single-point hitch which allows the yaw movements of the trailer with respect to the vehicle that tows it. In many occasions, it would have been sufficiently difficult to connect a single-point hitch to a trailer, let alone a two-point hitch that needs to be connected to a trailer at two points.

In connecting a trailer to a vehicle, an operator of the vehicle may typically need to move the vehicle back and forth multiple times before the hitch of a vehicle becomes sufficiently perfectly lined up with the trailer such that the trailer can be connected to the vehicle. To improve the chance of aligning a vehicle sufficiently well to be connected to a trailer, a spotter is often required, making such an operation a two-person operation, one as the driver of the vehicle and the other a person who guides the driver in aligning the vehicle with the trailer.

U.S. Pat. No. 4,664,403 to Livingston (herein after Livingston) discloses a trailer hitch structure for coupling a double caster-type wheel trailer to a tow vehicle having a conventional hitch bar fixed thereto and projecting rearwardly thereof. There is provided a rigid vehicle connector having a front portion fixedly connectable to the hitch bar. The front portion connects to a transversely extending rear portion which extends generally parallel to the vehicle bumper. This rear portion mounts adjustable bumper elements adjacent the opposite ends thereof, which bumper elements adjust for snug engagement with the vehicle bumper. A crossbar is positioned adjacent but slightly rearwardly from the rear portion and is coupled thereto through a swivel structure which defines a horizontal roll axis which extends in the longitudinal direction of the vehicle. The crossbar mounts a pair of hitch balls adjacent the opposite ends thereof. The trailer has a tongue structure provided with a pair of sidewardly spaced couplers for releasable engagement with the hitch balls. Livingston's trailer hitch structure relies on a couple of hitch balls configured to be coupled with a pair of couplers disposed on the trailer end for coupling of the hitch structure to the trailer.

There exists a need for a trailer hitch adaptor that can be used for making coupling of a trailer to a vehicle more easily accomplished and faster, eliminating the need for a spotter to help in getting a trailer connected to a towing vehicle. There also exists a need for a trailer hitch adaptor that can be used for making coupling of a trailer to a vehicle via a multi-point hitch more easily accomplished and faster, eliminating the need for a spotter to help in getting a trailer connected to a towing vehicle.

SUMMARY OF THE INVENTION

In accordance with the present invention, there is provided a trailer hitch adaptor for connecting a hitch to a trailer, the trailer hitch adaptor including an adaptor assembly having a front end connected to the hitch and a rear end connected to the trailer, the adaptor assembly including:
(a) a stop assembly disposed on the front end of the adaptor assembly;
(b) a bar configured to be attached to a front end of the trailer; and
(c) a cradle assembly disposed on the rear end of the adaptor assembly, the cradle assembly including an opening facing upwardly, wherein the cradle assembly is configured for receiving the bar,
wherein the trailer hitch adaptor is engaged with the trailer by bringing the stop assembly towards the bar until the bar had come in contact with the stop assembly before the bar is dropped into the opening of the cradle assembly to be disposed within the cradle assembly such that the trailer is capable of a pitch relationship with respect to the hitch.

In one embodiment, the bar includes two longitudinal ends and the trailer hitch adaptor further includes a plurality of locks, each lock including a plate configured for immobilizing each of the two longitudinal ends. In one embodiment, the bar further includes a central axis and a pair of rings each disposed about the central axis of the bar, the cradle assembly includes a pair of plates and the pair of rings are disposed apart a distance that is substantially the distance between the pair of plates, wherein when the bar is aligned to be disposed within the pair of plates, the pair of rings serve as guides to aid in locating the bar within the pair of plates. In one embodiment, the trailer hitch adaptor further includes a rotary joint interposed between the bar and the trailer, the rotary joint configured for allowing a roll movement of the trailer with respect to the bar. In one embodiment, the trailer hitch adaptor further includes a cushion disposed on the stop assembly to soften the contact. In one embodiment, the bar includes a circular cross-sectional profile and the opening of each cradle includes a circular cross-sectional profile matching the circular cross-sectional profile of the bar.

In accordance with the present invention, there is provided a method for connecting a hitch attached to a rear end of a vehicle to a front end of a trailer, wherein the vehicle has a central longitudinal axis, the trailer has a central longitudinal axis and a bar disposed on the front end of the trailer and the hitch has a stop assembly and a cradle assembly, the method including:
(a) backing up the vehicle towards the front end of the trailer such that the central longitudinal axis of the vehicle is substantially aligned with the central longitudinal axis of the trailer until the stop assembly of the hitch contacts the bar of the trailer; and
(b) engaging the bar with the cradle assembly such that the trailer is connected to the vehicle.

An object of the present invention is to provide an adaptor that facilitates the engagement of a trailer to a vehicle configured to tow it.

Another object of the present invention is to provide an adaptor that facilitates the engagement of a trailer to a vehicle configured to tow it, especially when the trailer is loaded and the yaw adjustment of the trailer is limited.

Another object of the present invention is to provide an adaptor that allows a trailer to be self-aligned with a vehicle to which the trailer is to be connected during the process of coupling the trailer to the vehicle.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—trailer hitch adaptor
4—trailer hitch
6—trailer
8—cradle
10—bar
12—ring
14—pin
16—plate
18—pin opening
20—bar opening
22—stop
24—cushion
26—cradle opening
28—central longitudinal axis of vehicle
30—bar
32—through hole
34—central longitudinal axis of trailer
36—connector
38—rod
40—rotary joint
42—pin
44—spring-loaded ball bearing
46—ring
48—distance between stops
50—bolt
52—upper plate
54—lower plate
56—opening
58—roll movement
60—stem
62—bolt
64—truck
66—caster wheel
68—trailer jack
70—safety chain
72—padlock
74—locator
76—nut
78—distance between rings
80—nut
82—height of stop
84—pitch movement
86—contact edge
88—possible contact area envelope

Particular Advantages of the Invention

The present trailer hitch adaptor enables a trailer to be connected to a vehicle quickly and with ease. The present trailer hitch adaptor provides an audible feedback to its user when the vehicle and trailer to which the trailer hitch adaptor is attached have been positioned properly relative to one another for the trailer to be connected to the vehicle as a first part of the adaptor attached to the vehicle impacts a second part of the adaptor attached to the trailer. As the first part impacts the second part, the impact causes the second part to be aligned properly to be connected to the first part. In contrast, a trailer hitch that includes two ball hitches at two different locations must be aligned with care, often with the aid of a spotter who helps guide the driver of the vehicle in positioning the vehicle just right for both ball hitches to be properly aligned to be engaged. No spotter is necessary for a trailer used in conjunction with the present trailer hitch adaptor.

The present trailer hitch adaptor spans laterally and as a result, does not provide point connections, but rather a connection that resists the tendency for the trailer to yaw with respect to the vehicle towing it when lateral forces develop, e.g., when the towing vehicle corners while towing the trailer. By having a coupled structure (that includes a bar and a cradle assembly for receiving the bar) that extends in a transverse direction to the direction of travel of a towing vehicle of a trailer, such lateral forces are experienced in the coupled structure but subsequently relieved by the rotation of caster wheels about their respective axes each disposed substantially normal to the surface upon which its corresponding caster wheel is supported.

DETAILED DESCRIPTION OF A PREFERRED EMBODIMENT

The term "about" is used herein to mean approximately, roughly, around, or in the region of. When the term "about"

is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
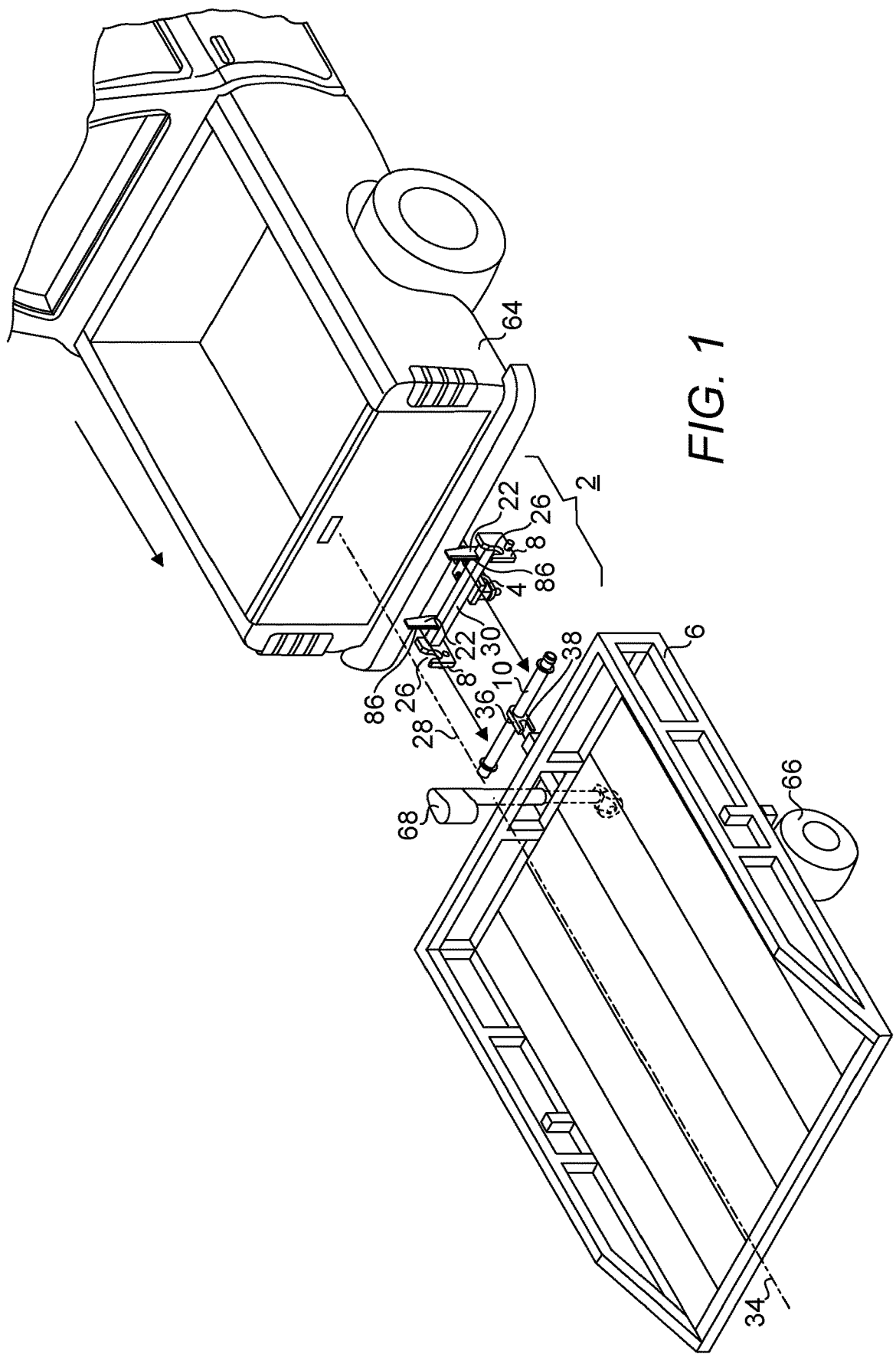
FIG. 1 is a diagram depicting a trailer hitch adaptor useful for coupling a trailer to a vehicle where the vehicle is maneuvered into position to be coupled to the trailer.
Figure 2:
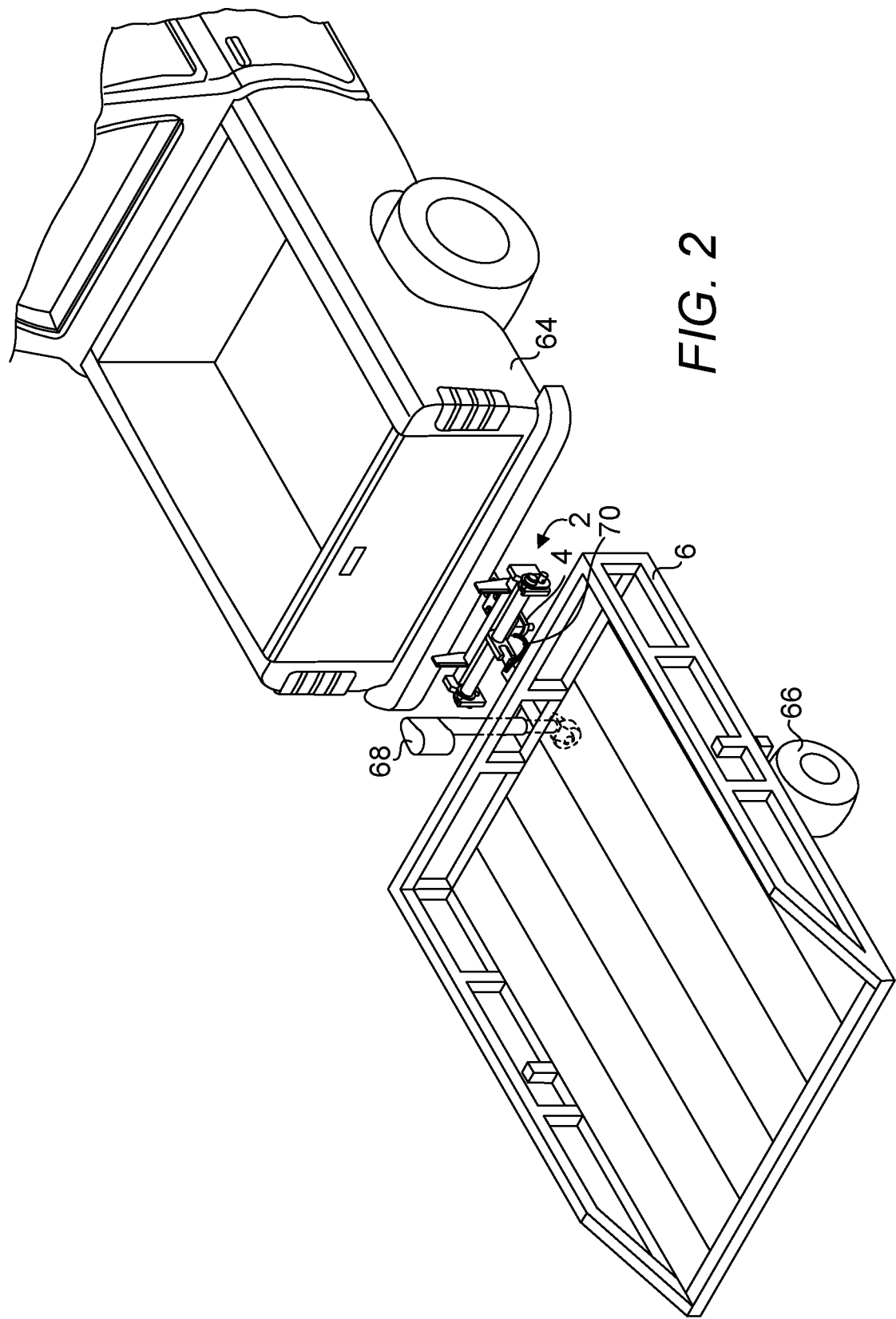
FIG. 2 is a diagram depicting a trailer hitch adaptor useful for coupling a trailer to a vehicle where the vehicle has already been coupled to the trailer.
Figure 4:
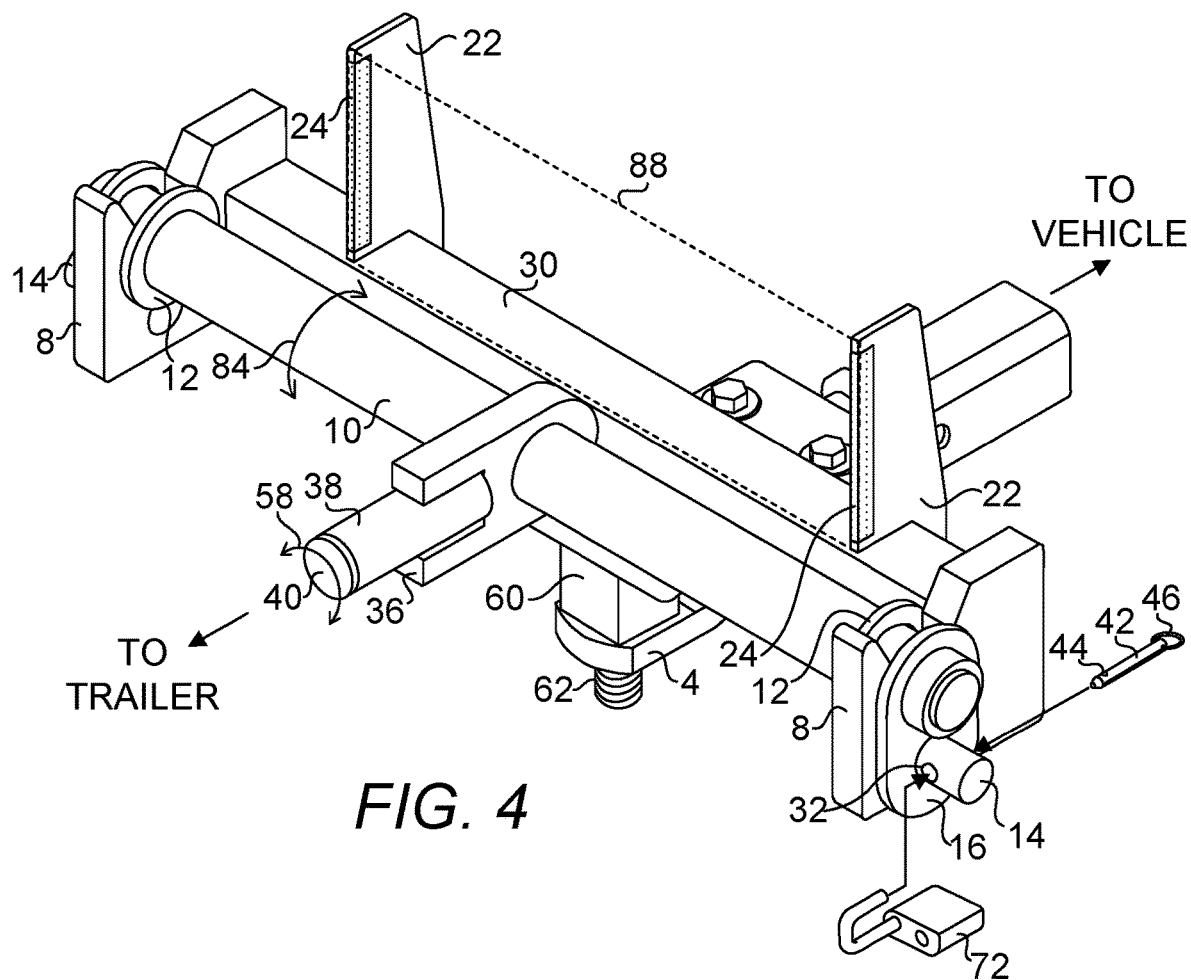
FIG. 4 is a top rear perspective close-up view of a trailer hitch adaptor after a bar configured for attachment to a trailer has been seated in a cradle assembly configured for attachment to a trailer hitch.

FIG. 1 is a diagram depicting a trailer hitch adaptor 2 useful for coupling a trailer 6 to a towing vehicle 64, e.g., a truck and car, etc., where the vehicle 64 is maneuvered into position to be coupled to the trailer 6. The trailer 6 is a structure, which upon connection to the towing vehicle 64, maintains its heading with respect to the towing vehicle 64 as the trailer 6 is incapable of yawing with respect to the towing vehicle. In order to do this, the trailer is one which is supported on a caster wheel system either with one or more caster wheels 66. A yaw-immobilized trailer makes maneuvering of the towing vehicle and its trailer easier and does not require a highly trained vehicle operator as in the case of a single-hitch trailer especially in backing up the trailer. The present trailer hitch adaptor 2 includes an adaptor assembly having a front end connected to the hitch 4 by means of bar 30 and a rear end connected to the trailer 6. The adaptor assembly includes a stop assembly facing the rear end of the adaptor assembly, the stop assembly disposed on the front end of the adaptor assembly and attached to the vehicle. In this example, the stop assembly includes two stops 22, each constructed from a plate attached to bar 30. Each of the two stops 22 includes an edge 86 for contacting bar 10 attached to the trailer by means of connector 36 and rod 38. There need not be only two stops 22. More stops 22 may be used, in addition to the two, provided that they have contact edges that are also parallel with the two and they are disposed away from the mid region between the two stops 22 to avoid coming into contact with connector 36 which protrudes from surfaces of bar 10. The edges 86 are preferably parallel to one another such that the bar 30 and hence the trailer 6 may be "squared up" against the edges 86 and aligned with the cradle assembly formed of cradles 8, upon impact once the vehicle 64 has been backed up against the bar 30. As long as the stops encompass a possible contact area envelope 88 (see FIG. 4) that is suitably large, the chance of a contact or a trailer position-correcting contact of the stops with bar 10 when the stops are moved against bar 10 is adequate. In one embodiment, rod 38 is connected to connector 36 by welding. Each cradle 8 includes an opening 26 facing upwardly and configured for receiving one longitudinal end of bar 10. The bar 30 includes a circular cross-sectional profile. Each cradle 8 has an opening having a cross-sectional profile that matches the cross-sectional profile of the bar 30 such that when the bar 30 is coupled with the cradles 8, the bar 30 is capable of a pitch relationship with respect to the cradles 8. Unlike Livingston's trailer hitch structure which relies on the coupling of two hitch balls with two couplers, as the present adaptor provides an audible cue as the stops 22 contact the bar 10, no spotter or a rear facing camera is required to assist in lining up the towing vehicle and the trailer. Here, only one bar 10 needs to be coupled with the cradle assembly, making the coupling of the towing vehicle and trailer easier and faster. As part of a routine operation of the trailer, in detaching a trailer from the vehicle to which it is attached, the front end of the trailer is typically raised to detach bar 10 from the cradle assembly. Therefore, once the trailer is ready to be reattached to a vehicle, bar 10 is already disposed at an appropriate height such that bar 10 will contact the stops 22 rather than inadvertently contacting another portion of the trailer hitch adaptor. A trailer jack 68 is used to assist in dropping bar 10 into the cradle assembly once minor lateral adjustments have been made if necessary. Once the audible cue has been received, the trailer can then be maneuvered with little effort to ensure that bar 10 is properly seated in the cradle assembly by dropping bar 10 into the opening of the cradle to be rotatably disposed within the cradles 8. Again, the cradle assembly need not be formed of two cradles 8. Rather, as long as the cradle assembly is formed of a structure that is capable of receiving bar 10 snugly while allowing the bar 10 to pitch (see pitch movement 84 as shown in FIG. 4) or rotate within the cradle assembly, the cradle assembly is considered suitable to be coupled with bar 10 as shown in FIG. 2. FIG. 2 is a diagram depicting a trailer hitch adaptor 2 useful for coupling a trailer 6 to a vehicle 64 where the vehicle 64 has already been coupled to the trailer 6. It can be seen from FIGS. 1 and 2 that, in connecting a hitch attached to a rear end of a vehicle to a front end of a trailer, the vehicle is backed up towards the front end of the trailer such that a central longitudinal axis 28 of the vehicle is substantially aligned with the central longitudinal axis 34 of the trailer until the stop assembly of the hitch contacts bar 10 of the trailer. The bar is then engaged with the cradle assembly such that the trailer is connected to the vehicle. It shall be noted that bar 10 may alternatively be disposed on the hitch and the stop and cradle assemblies may be alternatively disposed on the trailer. However, as there are more parts in the stop and cradle assemblies, it may be more economical to dispose the simpler bar 10 on the trailer as there may be more than one trailers matched to one towing vehicle. A safety chain 70 is shown deployed to ensure that in the event of an accidental detachment of bar 10 from its cradles 8, the vehicle 64 remains connected to the trailer 6 via the safety chain 70.

Figure 3:
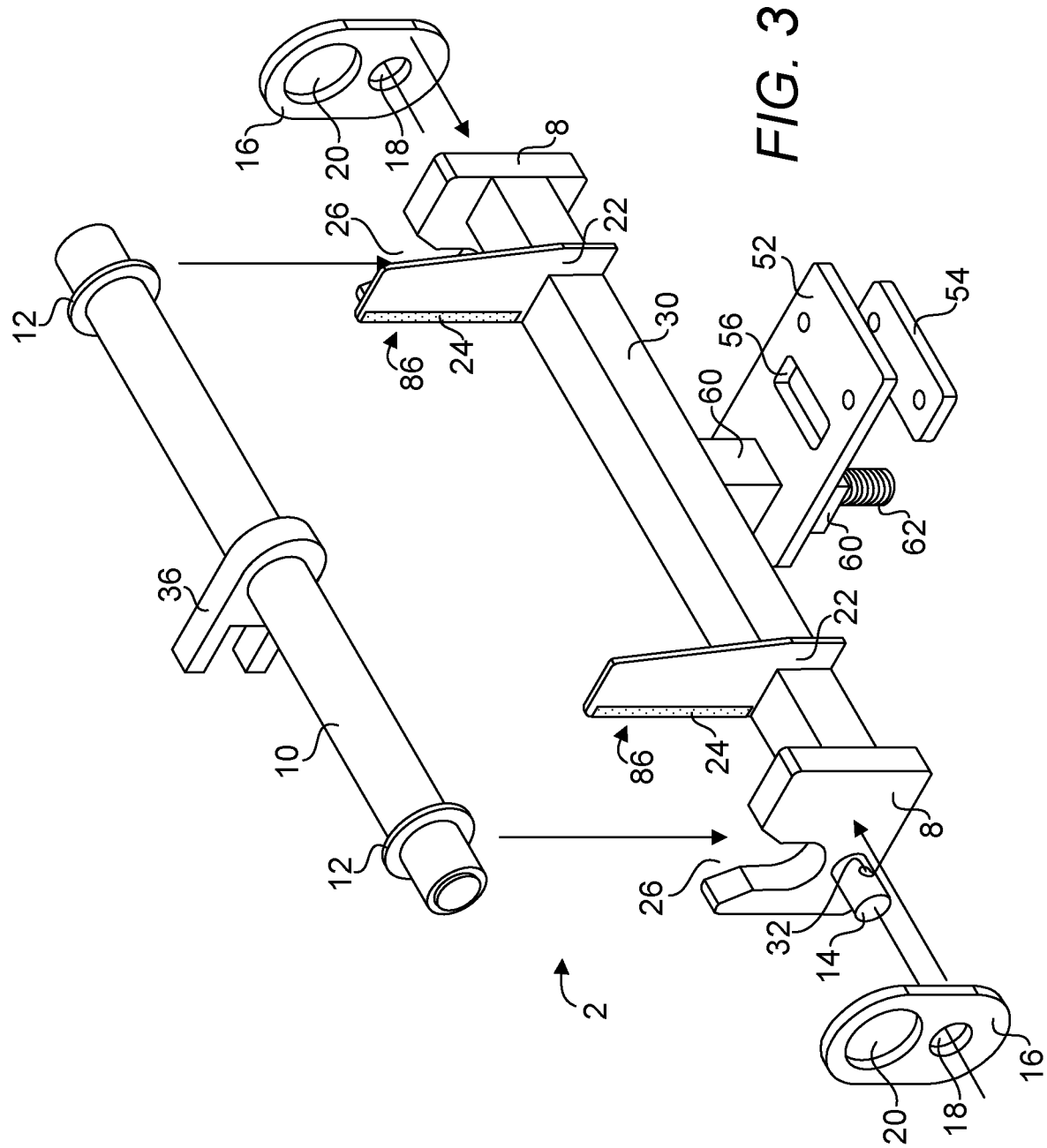
FIG. 3 is a top front perspective close-up view of a trailer hitch adaptor before a bar configured for attachment to a trailer has been seated in a cradle assembly configured for attachment to a trailer hitch.

FIG. 3 is a top front perspective close-up view of a trailer hitch adaptor 2 before a bar 10 configured for attachment to a trailer has been seated in a cradle assembly configured for attachment to a trailer hitch. It shall be noted that no trailer is shown connected to bar 10 and only connector 36 is shown. In the embodiment shown, a cushion 24, e.g., constructed from a rubber, an elastic or a polymeric material, etc., is disposed on the contact edge 86 of each stop 22 to soften the impact with bar 10 to reduce damages done to or marring of the contact surfaces. In another embodiment, no cushions are provided and the edge 86 of a stop that comes in contact with bar 10 is not enhanced to lessen the impact of the stops against bar 10. In order to aid in locating bar 10 laterally in the cradle, two spaced-apart rings 12, each fixedly attached to bar 10, e.g., via welding, are provided. Each ring 12 is disposed about the central axis of bar 10 and serves as a guide to aid in locating bar 10 within the pair of cradles 8. The distance 78 between the rings 12 is configured such that, upon coupling of bar 10 with the cradle assembly, the rings 12 are disposed between the cradles 8 and substantially a distance between the cradles 8 such that no significant lateral movement of bar 10 with respect to the cradles 8 is possible. Therefore, once seated with the cradles 8 with the rings 12 within the cradles 8, lateral movement of the bar 10 is essentially eliminated. However, bar 10 can fall out of the cradles 8 without it being further secured. A plurality of locks are provided, each lock including a plate configured for immobilizing each of the two longitudinal ends of bar 10. A pair of pins 14 are provided, each extending from a longitudinal end of bar 10. Two plates 16 are provided, each including an opening 20 for accommodating a longitudinal end of bar 10 and an opening 18 for accommodated pin 14. Upon seating bar 10 in cradles 8, a plate 16 is placed on each longitudinal end of bar 10 to prevent bar 10 from being detached through opening 26 as shown in FIG. 4.

FIG. 4 is a top rear perspective close-up view of a trailer hitch adaptor after a bar configured for attachment to a trailer has been seated in a cradle assembly configured for attachment to a trailer hitch. A pin 42 is then inserted through a through hole 32 of each pin 14 to prevent detachment of a plate 16 from each end of the adaptor 10. A pin 42 includes a ring 46 disposed at one end of the pin 42 to facilitate grasping of the pin 42 and prevent detachment of the pin 42 from that end and a spring-loaded ball bearing 44 to ease insertion of the pin 42 through the through hole 32 while preventing detachment of the pin 42 on the opposing end. In one embodiment, a padlock 72 is used instead to securely retain bar 10 within the cradle against theft or tampering of the locking of bar 10 within the cradle. In one embodiment, the trailer hitch adaptor further includes a rotary joint 40 interposed between bar 10 and the trailer, the rotary joint configured for allowing a roll movement 58 of the trailer with respect to bar 10.

Figure 5:
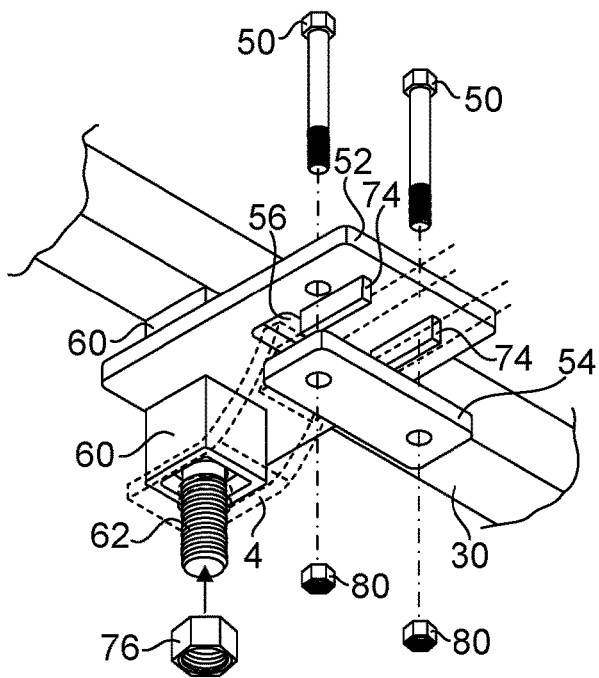
FIG. 5 is a bottom rear close-up view of some components of a trailer hitch adaptor useful for interfacing with a hitch of a vehicle to which the trailer hitch adaptor is attached.

FIG. 5 is a bottom rear close-up view of some components of a trailer hitch adaptor useful for interfacing with a hitch of a vehicle to which the trailer hitch adaptor is attached. Bar 30 is supported on a stem 60 at the top end of the stem 60. A bolt 62 is configured to extend from the stem 60 at the bottom end of the stem 60. An upper plate 52 extends from the stem 60 at substantially the midpoint of the stem 60. A pair of locators 74 is provided, each locator 74 extending from the bottom surface of the upper plate 52. In installing the present trailer hitch adaptor, the adaptor is arranged such that the bolt 62 can be inserted through a hole at the rear end of the hitch 4 before being secured with nut 76 while the locators 74 straddle the front end of the hitch 4. A lower plate 54 is placed underneath the front end of the hitch 4 with the through holes of the upper plate 52 and lower plate 54 aligned such that bolts 50 and nuts 80 can be used to fasten the plates 52, 54 to clamp the adaptor against the hitch 4 to secure the adaptor to the hitch 4. In constructing the present adaptor, suitable pieces of steel, e.g., low carbon steel, may be cut from stocks, worked to shape and welded together to form the adaptor according conventional welding techniques.

Figure 6:
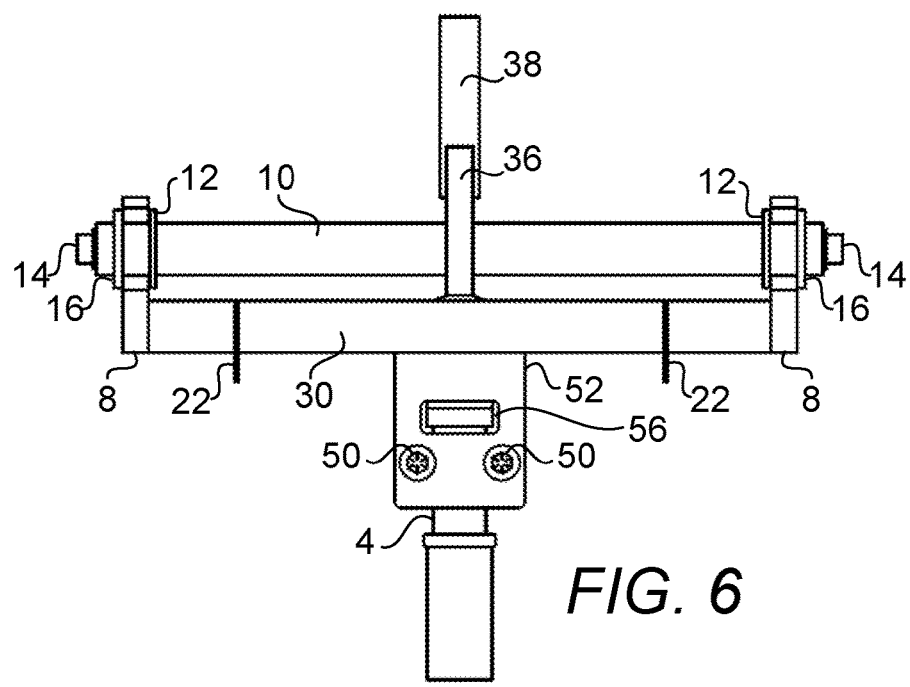
FIG. 6 is a top view of a trailer hitch adaptor.
Figure 7:
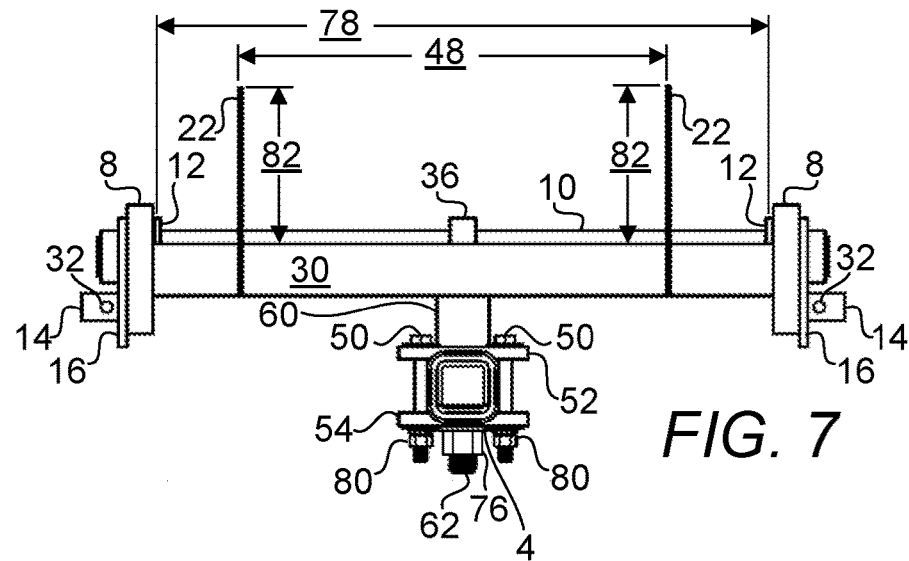
FIG. 7 is a front view of a trailer hitch adaptor.
Figure 8:
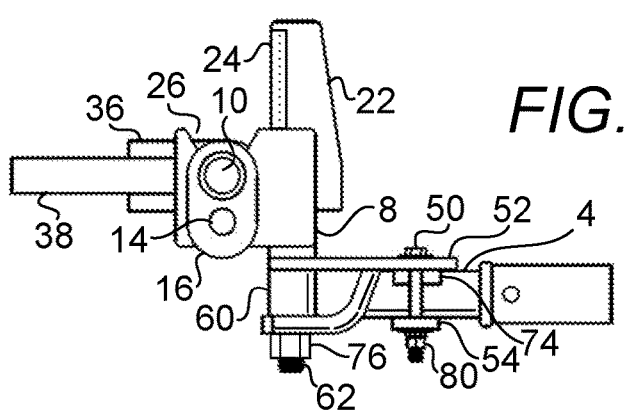
FIG. 8 is a right side view of a trailer hitch adaptor.

FIG. 6 is a top view of a trailer hitch adaptor with a portion of a hitch 4 shown connected to the adaptor. FIG. 7 is a front view of a trailer hitch adaptor with a portion of a hitch 4 shown connected to the adaptor. An opening 56 is provided in upper plate 52 to accommodate a protrusion of a portion of hitch 4. FIG. 8 is a right side view of a trailer hitch adaptor with a portion of a hitch 4 shown connected to the adaptor. Referring to FIG. 7, in one embodiment, the distance 48 between stops 22 is about 16 inches, the distance 78 between rings 12 is about 24 inches and the height 82 of a stop 22 is about 8 inches.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A trailer hitch adaptor for connecting a hitch to a trailer, said trailer hitch adaptor comprising an adaptor assembly having a front end connected to the hitch and a rear end connected to the trailer, said adaptor assembly comprising:
   (a) a stop assembly disposed on the front end of said adaptor assembly;
   (b) a bar configured to be attached to a front end of the trailer; and
   (c) a cradle assembly disposed on the rear end of said adaptor assembly, said cradle assembly comprising an opening facing upwardly, wherein said cradle assembly is configured for receiving said bar and said stop assembly is not connected directly to and is laterally spaced in between said cradle assembly,
   wherein said trailer hitch adaptor is configured to be engaged with the trailer by bringing said stop assembly towards said bar until said bar comes in contact with said stop assembly before said bar is dropped into said opening of said cradle to be disposed within said cradle assembly such that the trailer is capable of a pitch relationship with respect to the hitch.

2. The trailer hitch adaptor of claim 1, wherein said bar comprises two longitudinal ends and said trailer hitch adaptor further comprises a plurality of locks, each lock comprising a plate that comprises an opening for receiving one of said two longitudinal ends for immobilizing said one of said two longitudinal ends and said plate is configured to be removably secured to said cradle assembly.

3. The trailer hitch adaptor of claim 1, further comprising a rotary joint interposed between said bar and the trailer, said rotary joint configured for allowing a roll movement of the trailer with respect to said bar.

4. The trailer hitch adaptor of claim 1, further comprising a cushion disposed on said stop assembly to soften said contact.

5. The trailer hitch adaptor of claim 1, wherein the trailer is a trailer supported on caster wheels.

6. The trailer hitch adaptor of claim 1, wherein said bar comprises a circular cross-sectional profile and said opening of each said cradle comprises a circular cross-sectional profile matching said circular cross-sectional profile of said bar.

7. The trailer hitch adaptor of claim 1, wherein said bar further comprises a central axis and a pair of rings each disposed about said central axis of said bar, said cradle assembly comprises a pair of plates and said pair of rings are disposed apart at a distance that is substantially equal to a distance between said pair of plates, wherein when said bar is aligned to be disposed within said pair of plates, said pair of rings serve as guides to aid in locating the bar within said pair of plates.

8. A trailer hitch adaptor for connecting a hitch to a trailer, said trailer hitch adaptor comprising an adaptor assembly having a front end connected to the hitch and a rear end connected to the trailer, said adaptor assembly comprising:
   (a) a stop assembly disposed on the front end of said adaptor assembly;
   (b) a bar configured to be attached to a front end of the trailer, said bar comprises a central axis and a pair of rings each disposed about said central axis of said bar; and
   (c) a cradle assembly disposed on the rear end of said adaptor assembly, said cradle assembly comprises an opening facing upwardly and a pair of plates, wherein said cradle assembly is configured for receiving said bar,
   wherein said trailer hitch adaptor is configured to be engaged with the trailer by bringing said stop assembly towards said bar until said bar had come in contact with said stop assembly before said bar is dropped into said opening of said cradle to be disposed within said cradle assembly such that the trailer is capable of a pitch relationship with respect to the hitch, said pair of rings are disposed apart a distance that is substantially the distance of a distance between said pair of plates and when said bar is aligned to be disposed within said pair of plates, said pair of rings serve as guides to aid in locating the bar within said pair of plates.

9. A trailer hitch adaptor for connecting a hitch to a trailer, said trailer hitch adaptor comprising an adaptor assembly having a front end connected to the hitch and a rear end connected to the trailer, said adaptor assembly comprising:
   (a) a pair of stops disposed on the front end of said adaptor assembly;
   (b) a bar configured to be attached to the trailer, said bar comprising two longitudinal ends; and
   (c) a pair of cradles disposed on the rear end of said adaptor assembly, each said cradle comprising an opening facing upwardly, wherein each said cradle is configured for receiving one of said two longitudinal ends of said bar and said pair of stops are not connected directly to and are laterally spaced in between said pair of cradles,
   wherein said trailer hitch adaptor is configured to be engaged with the trailer by bringing said pair of stops towards said bar until said bar comes in contact with said pair of stops before said bar is dropped into said opening of said pair of cradles to be disposed within said pair of cradles such that the trailer is capable of a pitch relationship with respect to the hitch.

10. The trailer hitch adaptor of claim 9, further comprising a plurality of locks, each lock comprising a plate that comprises an opening for receiving one of said two longitudinal ends for immobilizing said one of said two longitudinal ends.

11. The trailer hitch adaptor of claim 9, further comprising a rotary joint interposed between said bar and the trailer, said rotary joint configured for allowing a roll movement of the trailer with respect to said bar.

12. The trailer hitch adaptor of claim 9, further comprising a cushion disposed on one of said stops to soften said contact.

13. The trailer hitch adaptor of claim 9, wherein the trailer is a trailer supported on caster wheels.

14. The trailer hitch adaptor of claim 9, wherein said bar comprises a circular cross-sectional profile and said opening of each said cradle comprises a circular cross-sectional profile matching said circular cross-sectional profile of said bar.

15. The trailer hitch adaptor of claim 9, wherein said bar further comprises a central axis and a pair of rings each disposed about said central axis of said bar and said pair of rings are disposed apart a distance that is substantially a distance between said pair of cradles, wherein when said bar is aligned to be disposed within said pair of cradles, said pair of rings serve as guides to aid in locating the bar within said pair of cradles.

16. A trailer hitch adaptor for connecting a hitch to a trailer, said trailer hitch adaptor comprising an adaptor assembly having a front end connected to the hitch and a rear end connected to the trailer, said adaptor assembly comprising:
   (a) a pair of stops disposed on the front end of said adaptor assembly;
   (b) a bar configured to be attached to the trailer, said bar comprises two longitudinal ends, a central axis and a pair of rings each disposed about said central axis of said bar; and
   (c) a pair of cradles disposed on the rear end of said adaptor assembly, each said cradle comprising an opening facing upwardly, wherein each said cradle is configured for receiving one of said two longitudinal ends of said bar,
   wherein said trailer hitch adaptor is configured to be engaged with the trailer by bringing said pair of stops towards said bar until said bar had come in contact with said pair of stops before said bar is dropped into said opening of said pair of cradles to be disposed within said pair of cradles such that the trailer is capable of a pitch relationship with respect to the hitch, said pair of rings are disposed apart a distance that is substantially a distance between said pair of cradles and when said bar is aligned to be disposed within said pair of cradles, said pair of rings serve as guides to aid in locating the bar within said pair of cradles.

* * * * *